(12) United States Patent
Yoshida et al.

(10) Patent No.: US 10,731,503 B2
(45) Date of Patent: Aug. 4, 2020

(54) TURBOCHARGER

(71) Applicant: MITSUBISHI HEAVY INDUSTRIES ENGINE & TURBOCHARGER, LTD., Sagamihara-shi, Kanagawa (JP)

(72) Inventors: Toyotaka Yoshida, Tokyo (JP); Toru Hoshi, Tokyo (JP); Yosuke Dammoto, Tokyo (JP); Yoji Akiyama, Tokyo (JP)

(73) Assignee: MITSUBISHI HEAVY INDUSTRIES ENGINE & TURBOCHARGER, LTD., Sagamihara-Shi (JP)

( * ) Notice: Subject to any disclaimer, the term of this patent is extended or adjusted under 35 U.S.C. 154(b) by 54 days.

(21) Appl. No.: 16/082,859

(22) PCT Filed: Mar. 30, 2016

(86) PCT No.: PCT/JP2016/060399
§ 371 (c)(1),
(2) Date: Sep. 6, 2018

(87) PCT Pub. No.: WO2017/168635
PCT Pub. Date: Oct. 5, 2017

(65) Prior Publication Data
US 2019/0101018 A1 Apr. 4, 2019

(51) Int. Cl.
*F01D 17/16* (2006.01)
*F02B 37/24* (2006.01)
(Continued)

(52) U.S. Cl.
CPC ........... *F01D 17/165* (2013.01); *F01D 5/048* (2013.01); *F02B 37/24* (2013.01); *F02C 6/12* (2013.01);
(Continued)

(58) Field of Classification Search
CPC .... F01D 17/165; F01D 5/048; F05D 2220/40; F02C 6/12; F02B 37/24; Y02T 10/144
See application file for complete search history.

(56) References Cited

U.S. PATENT DOCUMENTS

| 4,770,603 A | 9/1988 | Engels et al. |
| 2011/0206500 A1* | 8/2011 | Nagao ..................... F01D 5/141 |
| | | 415/148 |

(Continued)

FOREIGN PATENT DOCUMENTS

| EP | 2787181 A1 | 10/2014 |
| JP | 62-162730 A | 7/1987 |

(Continued)

OTHER PUBLICATIONS

International Search Report and Written Opinion of the International Searching Authority (Forms PCT/ISA/210 and PCT/ISA/237) for Application No. PCT/JP2016/060399, dated Jun. 14, 2016, with an English translation.

*Primary Examiner* — Christopher Verdier
(74) *Attorney, Agent, or Firm* — Birch, Stewart, Kolasch & Birch, LLP.

(57) ABSTRACT

A turbocharger (10) comprising: a rotating shaft (14); a turbine wheel (12); a turbine housing (31); a scroll flowpath (34) having gas flowing therethrough that rotates and drives the turbine wheel (12); a nozzle flowpath (35) that guides gas radially inwards from the scroll flowpath (34) and supplies gas to the turbine wheel (12); and a vane (53) that adjusts the amount of gas introduced in the nozzle flowpath (35). The vane (53) comprises a guide section (60) that guides the gas flow (F) in the turbine wheel (12) radially inwards.

2 Claims, 7 Drawing Sheets

(51) Int. Cl.
*F02C 6/12* (2006.01)
*F01D 5/04* (2006.01)

(52) U.S. Cl.
CPC ......... *F05D 2220/40* (2013.01); *Y02T 10/144* (2013.01)

(56) References Cited

U.S. PATENT DOCUMENTS

2014/0341729 A1    11/2014  Osako et al.
2015/0104296 A1     4/2015  Yokoyama et al.

FOREIGN PATENT DOCUMENTS

| | | |
|---|---|---|
| JP | 11-229815 A | 8/1999 |
| JP | 2005-351241 A | 12/2005 |
| JP | 2013-137017 A | 7/2013 |
| JP | 2013-181396 A | 9/2013 |
| JP | 2015-229989 A | 12/2015 |
| WO | WO 2013/106503 A1 | 7/2013 |

\* cited by examiner

TURBOCHARGER

TECHNICAL FIELD

The present invention relates to a turbocharger.

BACKGROUND ART

A variable capacity-type turbocharger is known as a turbocharger in which the flow rate of gas supplied to a turbine wheel is made variable through a change in the opening area of a nozzle flow path for flowing into the turbine wheel from the radially outer side of the turbine wheel.

Disclosed in PTL 1 is a variable capacity-type turbocharger configured such that a plurality of plate-shaped vanes are disposed at intervals in a circumferential direction in a nozzle flow path. In this configuration, the nozzle flow path formed between the vanes that are next to each other in the circumferential direction has a variable opening area by each of the vanes being rotatably supported and the angle of the vane being changed.

CITATION LIST

Patent Literature

[PTL 1] Japanese Unexamined Patent Application Publication No. 2013-137017

SUMMARY OF INVENTION

Technical Problem

In the vicinity of the trailing edge of a blade, exhaust gas sent into a turbine wheel from the nozzle flow path on the radially outer side flows through a gas flow path between a disk of the turbine wheel and a shroud disposed on the radially outer side of the blade. At this time, a centrifugal force acts on the exhaust gas as a result of turbine wheel rotation, and thus the exhaust gas is biased to the radially outer side of the gas flow path in the vicinity of the trailing edge of the blade. As a result, the flow speed distribution of the exhaust gas becomes nonuniform in the radial direction of the gas flow path. Then, the exhaust gas sent out from the trailing edge of the blade makes an attempt at flow speed distribution averaging by means of flow mixing between high- and low-flow speed parts on the downstream side thereof, and disturbance arises in the exhaust gas as a result. This results in a decline in turbine efficiency.

An object of the present invention is to provide a turbocharger with which turbine efficiency enhancement can be achieved from a uniform gas flow speed distribution in the vicinity of the trailing edge of a blade of a turbine wheel.

Solution to Problem

According to a first aspect of the present invention, a turbocharger includes a rotating shaft extending along an axis, a turbine wheel disposed on a first end portion side of the rotating shaft, a plurality of blades being formed at intervals in a circumferential direction on the turbine wheel, a turbine housing accommodating the turbine wheel, a scroll flow path formed in the turbine housing, continuing in the circumferential direction on a radially outer side of the turbine wheel, and having gas flowing therethrough that rotates and drives the turbine wheel, a nozzle flow path that guides the gas radially inwards from the scroll flow path and supplies the gas to the turbine wheel, and a vane that adjusts the amount of the gas introduced in the nozzle flow path, in which the vane includes a guide section that guides the gas such that at least part of the flow of the gas flows radially inwards on a trailing edge side of the blade of the turbine wheel.

According to this configuration, gas flowing through the scroll flow path is guided to the turbine wheel on the radially inner side through the nozzle flow path. By the gas that is introduced from the nozzle flow path on the radially outer side colliding with the blade, the turbine wheel rotates around a central axis. A centrifugal force acts a result of the rotation of the turbine wheel, and thus the gas may be biased radially outwards as the gas approaches the trailing edge of the turbine wheel. However, the guide section formed in the vane causes at least part of the flow of the gas sent into the turbine wheel to be guided to flow radially inwards on the trailing edge side of the blade of the turbine wheel. Accordingly, the gas is unlikely to be biased radially outwards. As a result, the gas flow is dispersed throughout the radial direction downstream of the trailing edge of the blade, no flow speed imbalance is likely to occur downstream of the trailing edge of the blade, and loss reduction can be achieved.

In the turbocharger according to a second aspect of the present invention according to the first aspect, the guide section may be formed in a pressure surface on a side of the vane where the gas flow collides and have a convex portion rising in a trailing edge portion on a downstream side in a flow direction of the gas.

As a result, gas flowing along the vane is guided to be divided into both sides of the convex portion in the width direction by the convex portion formed in the trailing edge portion of the vane. As a result, part of the flow of the gas passing through the vane is guided to the radially inner side of the turbine wheel.

In the turbocharger according to a third aspect of the present invention according to the second aspect, the guide section may have a concave portion formed in a leading edge portion of the pressure surface on an upstream side in the flow direction and concave to a surface side opposite to the pressure surface.

As a result, gas colliding with the vane is guided by the concave portion formed in the leading edge portion of the vane to be brought toward the middle portion in the width direction. Accordingly, the gas flow heading toward the trailing edge portion from the leading edge portion of the vane flows to be brought to the middle portion in the width direction by the concave portion and then spread and caused to branch to both sides in the width direction by the convex portion. As a result, the gas flow can be more efficiently controlled by the convex portion.

Advantageous Effects of Invention

With the above-described turbocharger, turbine efficiency enhancement can be achieved from a uniform gas flow speed distribution in the vicinity of the trailing edge of a blade of a turbine wheel.

DESCRIPTION OF EMBODIMENTS

Figure 1:
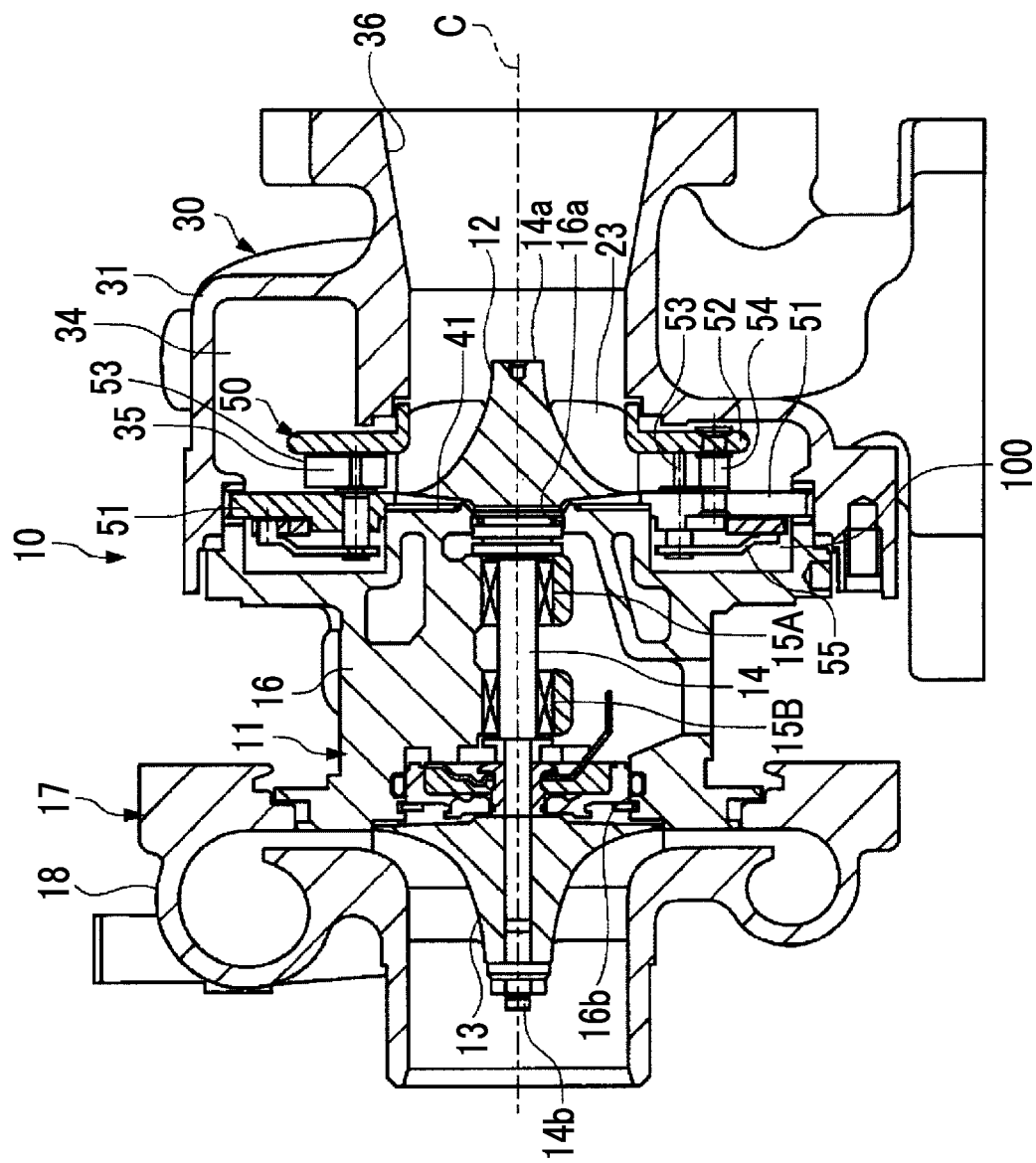
FIG. 1 is a cross-sectional view illustrating an overall configuration of a turbocharger according to an embodiment of the present invention.

FIG. 1 is a cross-sectional view illustrating an overall configuration of a turbocharger according to an embodiment of the present invention.

As illustrated in FIG. 1, a turbocharger 10 according to the present embodiment is provided with a turbocharger body 11, a compressor 17, and a turbine 30. The turbocharger 10 is, for example, mounted as an auxiliary machine for an engine in an automobile or the like with a posture in which a rotating shaft 14 extends in the horizontal direction.

The turbocharger body 11 is provided with the rotating shaft 14, bearings 15A and 15B, and a bearing housing 16.

The bearing housing 16 is supported by a car body or the like via, for example, a bracket (not illustrated), the compressor 17, and the turbine 30. The bearing housing 16 has an opening 16a on one end side thereof and has an opening 16b on the other end side thereof.

The bearings 15A and 15B are disposed in the bearing housing 16. The bearings 15A and 15B support the rotating shaft 14 such that the rotating shaft 14 is rotatable around a central axis C.

A first end portion 14a and a second end portion 14b of the rotating shaft 14 protrude to the outside of the bearing housing 16 through the openings 16a and 16b.

The compressor 17 is disposed on the other end side of the bearing housing 16. The compressor 17 is provided with a compressor wheel 13 and a compressor housing 18.

The compressor wheel 13 is disposed in the second end portion 14b of the rotating shaft 14 outside the bearing housing 16. The compressor wheel 13 rotates around the central axis C together with the rotating shaft 14.

The compressor housing 18 is connected to the other end side of the bearing housing 16. The compressor housing 18 accommodates the compressor wheel 13 therein.

The turbine 30 is disposed on one end side of the bearing housing 16. The turbine 30 is provided with a turbine housing 31 and a turbine wheel 12.

Figure 2:
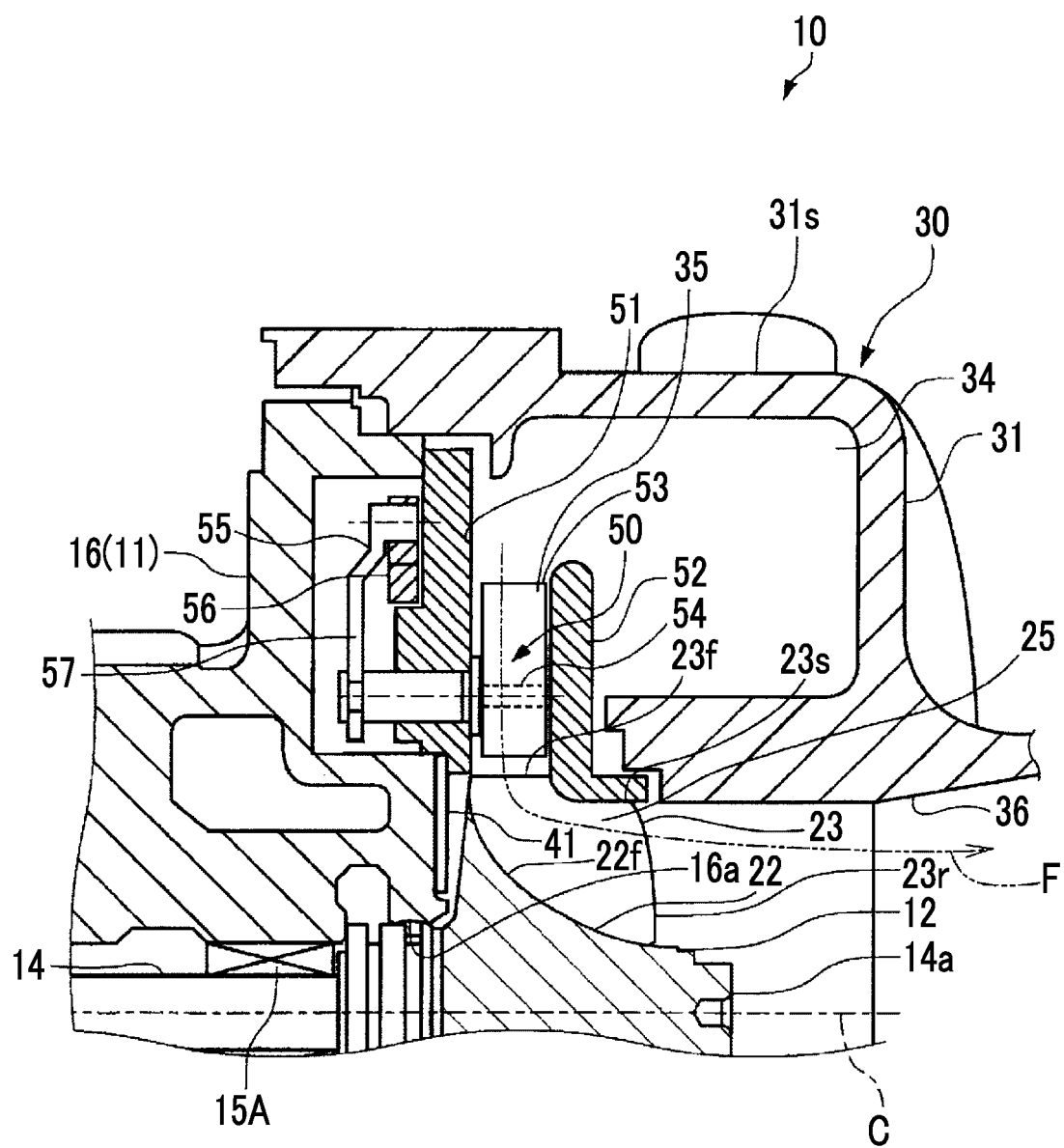
FIG. 2 is a cross-sectional view illustrating a configuration around a turbine wheel constituting the turbocharger.
Figure 3:
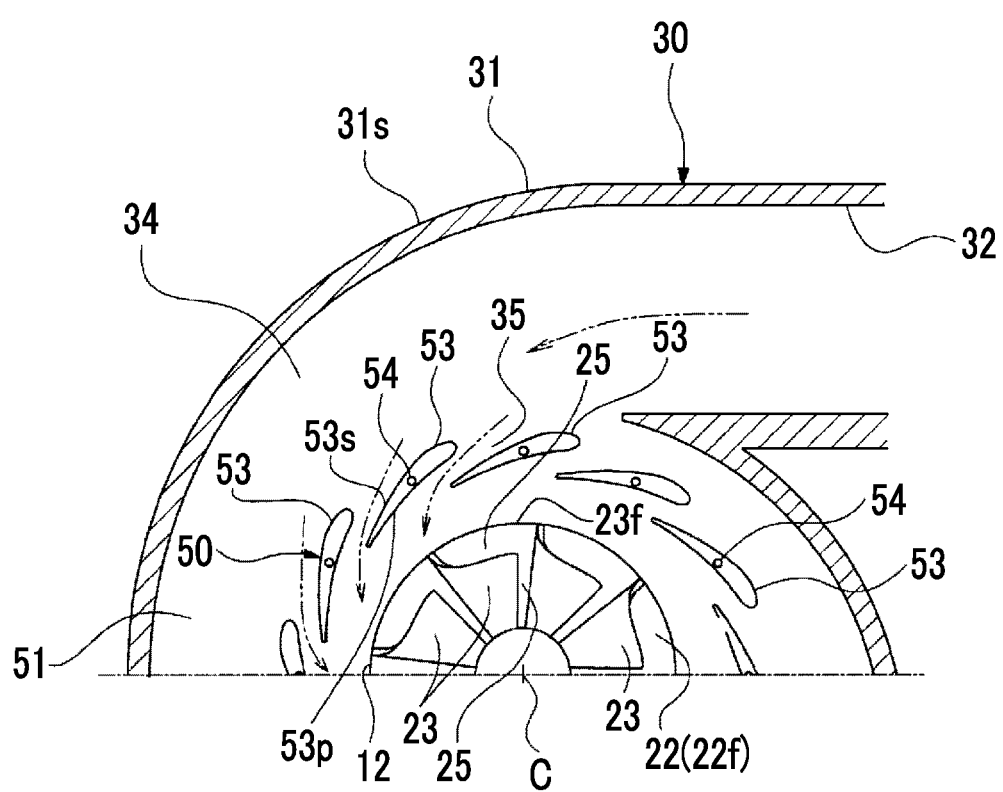
FIG. 3 is a cross-sectional view illustrating the turbine wheel and a nozzle flow path and a scroll flow path disposed on the radially outer side thereof.

FIG. 2 is a cross-sectional view illustrating a configuration around the turbine wheel constituting the turbocharger. FIG. 3 is a cross-sectional view illustrating the turbine wheel and a nozzle flow path and a scroll flow path disposed on the radially outer side thereof.

As illustrated in FIGS. 2 and 3, the turbine housing 31 is connected to one end side of the bearing housing 16. The turbine housing 31 accommodates the turbine wheel 12 therein.

The turbine housing 31 is provided with a gas introduction section 32 (refer to FIG. 3), a scroll flow path 34, a nozzle flow path 35, and an exhaust section 36.

As illustrated in FIG. 3, the gas introduction section 32 sends exhaust gas discharged from the engine (not illustrated) into the scroll flow path 34.

The scroll flow path 34, which leads to the gas introduction section 32, is formed continuously in the circumferential direction on the radially outer side of the turbine wheel 12. The scroll flow path 34 forms a flow path through which exhaust gas rotating and driving the turbine wheel 12 flows in the circumferential direction.

As illustrated in FIGS. 2 and 3, the nozzle flow path 35 is formed on the side of the turbine housing 31 that faces the bearing housing 16. The nozzle flow path 35 is formed such that the scroll flow path 34 and the turbine wheel 12 communicate with each other in the radial direction over the entire circumference in the circumferential direction.

As illustrated in FIG. 2, exhaust gas discharged from the turbine wheel 12 flows through the exhaust section 36. The exhaust section 36 is continuously formed in a direction away from the turbocharger body 11 along the central axis C direction of the rotating shaft 14 from an outer circumferential portion of the turbine wheel 12.

The turbine wheel 12 is disposed integrally with the first end portion 14a of the rotating shaft 14 outside the bearing housing 16. The turbine wheel 12 rotates around the central axis C together with the rotating shaft 14.

As illustrated in FIGS. 2 and 3, the turbine wheel 12 is provided with a disk 22 and a blade 23.

The disk 22 has a certain length in the central axis C direction and is fixed to the first end portion 14a of the rotating shaft 14. The disk 22 has a disk shape extending radially outwards and has a disk surface 22f on one side in the central axis C direction. The disk surface 22f is formed by a curved surface gradually heading to the bearing housing 16 side on the other side in the central axis C direction from the exhaust section 36 (refer to FIG. 2) side on one side in the central axis C direction as the disk surface 22f heads radially outwards.

On the disk surface 22f, a plurality of the blades 23 are disposed at intervals in the circumferential direction around the central axis C. The blade 23 has a leading edge 23f heading radially outwards and facing the nozzle flow path 35 and a trailing edge 23r heading to one side in the central axis C direction and facing the exhaust section 36. The blade 23 is formed such that an outer edge 23s on the radially outer side is close to a nozzle plate 52 positioned on the radially outer side.

In the turbine 30, exhaust gas flowing in from the gas introduction section 32 flows in the circumferential direction through the outer circumferential side of the turbine wheel 12 along the scroll flow path 34. The exhaust gas flowing in the circumferential direction as described above flows radially inwards through the nozzle flow path 35 and hits the blade 23 of the turbine wheel 12. As a result, the turbine wheel 12 is rotated and driven. The exhaust gas passing through the turbine wheel 12 is discharged into the exhaust section 36 from the inner circumferential side of the turbine wheel 12.

In the turbine wheel 12, the exhaust gas flowing radially inwards from the nozzle flow path 35 on the radially outer side passes through an impeller flow path 25 between the disk surface 22f of the disk 22 and the nozzle plate 52 and between the blades 23 next to each other in the circumferential direction. The exhaust gas flowing radially inwards from the leading edge 23f of the blade 23 is changed in flow direction by the curvature of the disk surface 22f and discharged along the central axis C direction from the trailing edge 23r of the blade 23.

The nozzle flow path 35 is provided with a variable vane mechanism 50 adjusting the amount of exhaust gas supplied from the scroll flow path 34 to the turbine wheel 12 through the nozzle flow path 35.

The variable vane mechanism 50 is provided with a nozzle mount 51, the nozzle plate 52, a vane 53, and a drive unit 55.

The nozzle mount 51 is disposed on the bearing housing 16 side of the nozzle flow path 35 and formed in an annular plate shape positioned in a plane orthogonal to the central axis C.

As illustrated in FIG. 2, the nozzle plate 52 is apart from the nozzle mount 51 on the side of the nozzle flow path 35 that is opposite to the nozzle mount 51. The nozzle flow path 35 is between the nozzle mount 51 and the nozzle plate 52.

A back plate 41 blocking the outer circumferential portion gap of the first end portion 14a of the rotating shaft 14 is disposed on the radially inner side of the nozzle mount 51.

As illustrated in FIGS. 2 and 3, the vane 53 has a plate shape such as a vane shape and is disposed between the nozzle mount 51 and the nozzle plate 52. A plurality of the vanes 53 are disposed at intervals in the circumferential direction in the nozzle flow path 35 continuing in the circumferential direction. Each vane 53 is rotatably supported around the central axis of a shaft 54 by the shaft 54 penetrating the nozzle mount 51 in the central axis C direction.

As illustrated in FIG. 2, the drive unit 55 adjusts the angle of the vane 53 by rotating the shaft 54 protruding from the nozzle mount 51 to the bearing housing 16 side. The drive unit 55 is disposed on the bearing housing 16 side with respect to the nozzle mount 51. The drive unit 55 is provided with a drive ring 56 and a link arm 57.

The drive ring 56 has an annular shape and is disposed closer to the outer circumferential side in the radial direction than the shaft 54. The drive ring 56 is disposed to be orbitable in the circumferential direction thereof by an actuator (not illustrated) or the like.

The link arms 57 are respectively connected to the shafts 54. One end of each link arm 57 is connected to the shaft 54 and the other end of each link arm 57 is rotatably connected to the drive ring 56. As a result of rotation of the drive ring 56, the link arm 57 rotates around the shaft 54. As a result, the angle of the plurality of vanes 53 disposed in the circumferential direction changes around the central axis of the shaft 54.

Once the angle of the vanes 53 change, the gap between the vanes 53 and 53 next to each other in the circumferential direction increases and decreases. As a result, the amount of exhaust gas sent (introduced) into the turbine wheel 12 through the nozzle flow path 35 increases and decreases.

Figure 4:
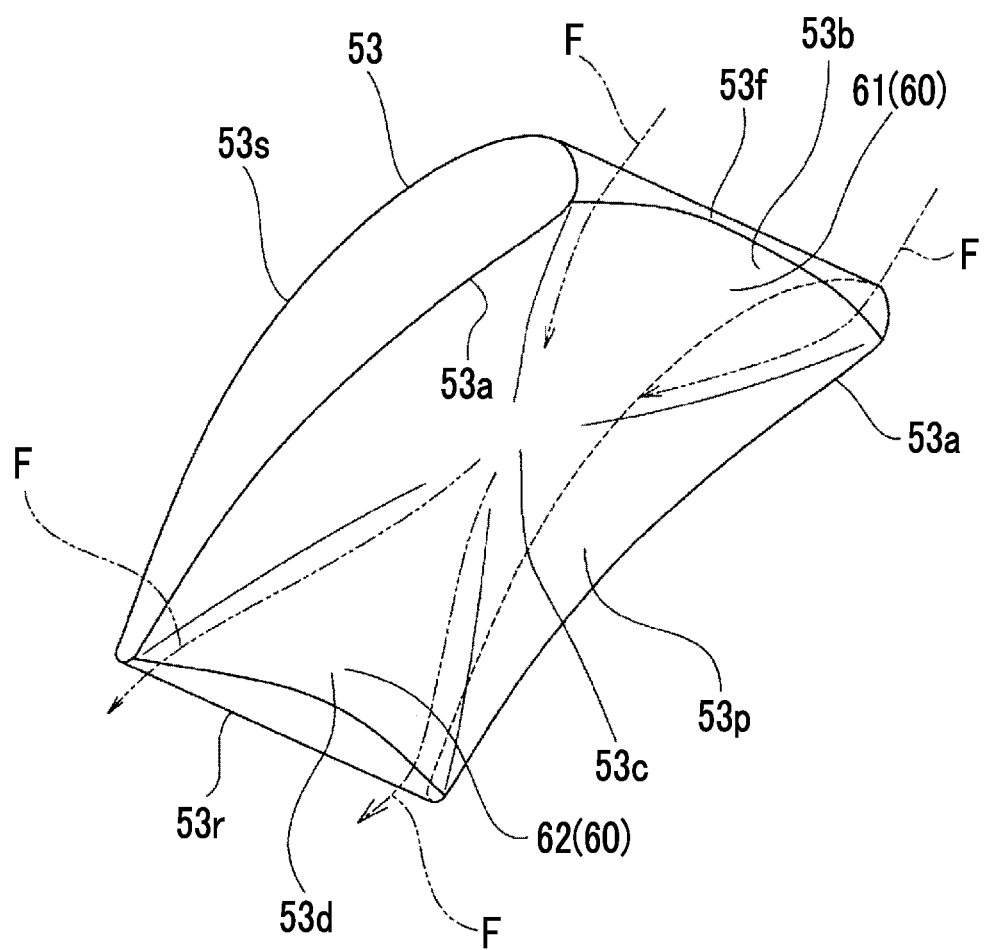
FIG. 4 is a perspective view illustrating the shape of a vane disposed in the nozzle flow path.
Figure 5:
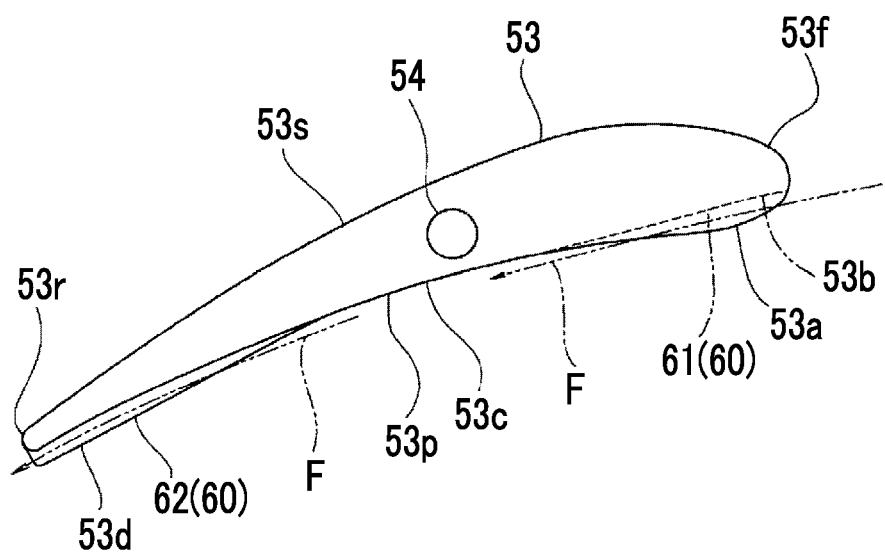
FIG. 5 is a side view of the vane.

FIG. 4 is a perspective view illustrating the shape of the vane disposed in the nozzle flow path of the turbocharger. FIG. 5 is a side view of the vane.

As illustrated in FIGS. 3, 4, and 5, each vane 53 has the cross-sectional shape of a vane and has a pressure surface 53p with which a flow F of exhaust gas flowing in from the scroll flow path 34 collides and a suction surface 53s on the side opposite thereto.

As illustrated in FIGS. 4 and 5, the pressure surface 53p of the vane 53 is provided with a guide section 60. The guide section 60 suppresses radially outward biasing of the exhaust gas flow F by guiding, radially inwards, at least part of the flow F of exhaust gas sent into the turbine wheel 12 on the radially inner side through the vane 53 in the vicinity of the trailing edge 23r of the blade 23. The guide section 60 has a concave curved surface (concave portion) 61 and a convex curved surface (convex portion) 62. In the pressure surface 53p of the vane 53, the concave curved surface 61 is formed on a leading edge 53f side on the upstream side in the flow direction of the flow F and the convex curved surface 62 is formed on a trailing edge 53r side on the downstream side in the flow direction of the flow F.

The concave curved surface 61 is formed such that a width-direction intermediate portion 53b is concave to the suction surface 53s side with respect to both end portions 53a in the width direction on the leading edge 53f side of the pressure surface 53p. In addition, the concave curved surface 61 is formed such that the concave dimension of the width-direction intermediate portion 53b gradually decreases from the leading edge 53f side toward the trailing edge 53r side.

The pressure surface 53p is formed in a planar shape in the width direction connecting the both end portions 53a in the width direction in an intermediate portion 53c in the direction connecting the leading edge 53f and the trailing edge 53r.

The convex curved surface 62 is formed such that a width-direction intermediate portion 53d rises in a direction away from the suction surface 53s side with respect to the both end portions 53a and 53a in the width direction on the trailing edge 53r side of the pressure surface 53p. In addition, the convex curved surface 62 is formed such that the rise dimension of the width-direction intermediate portion 53d gradually increases from the intermediate portion 53c side toward the trailing edge 53r side.

Figure 6:
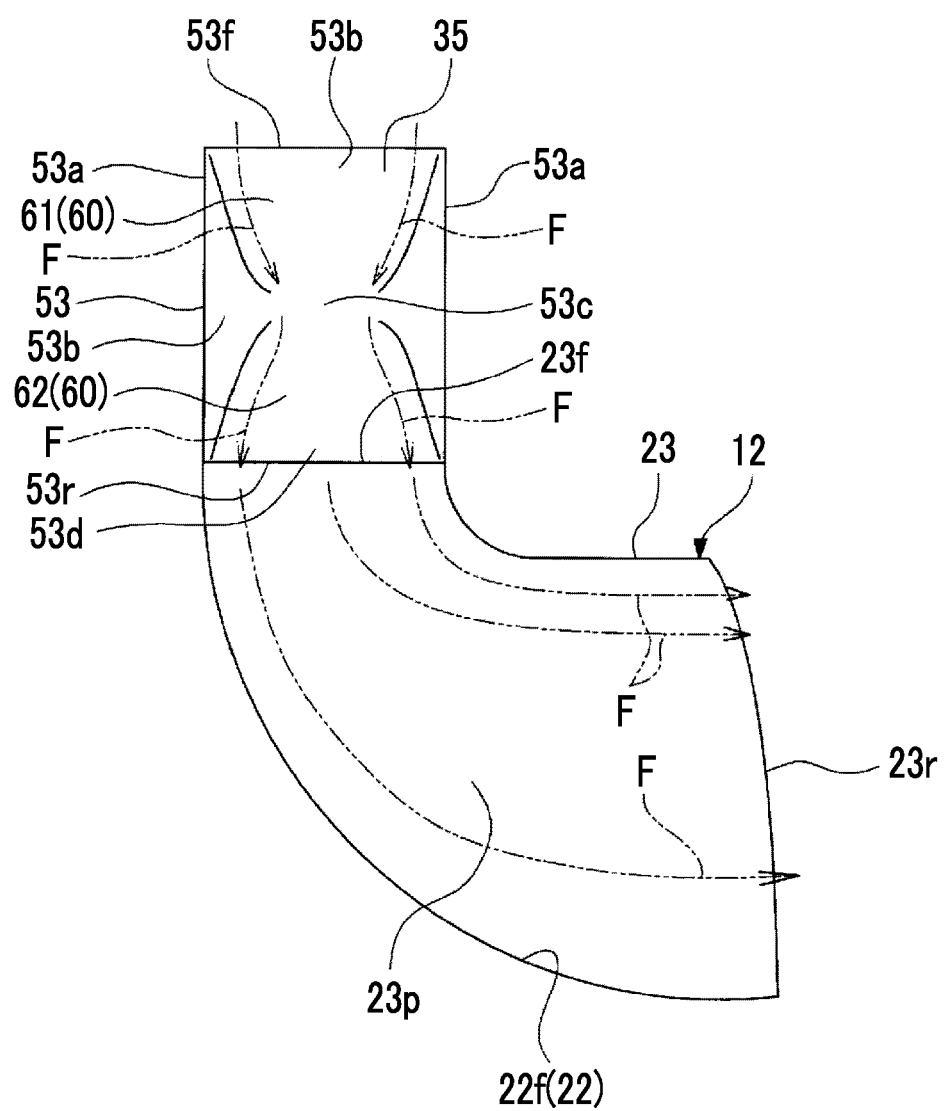
FIG. 6 is a schematic diagram illustrating how exhaust gas flows that flows into the turbine wheel through the vane disposed in the nozzle flow path.

FIG. 6 is a schematic diagram illustrating how exhaust gas flows that flows into the turbine wheel through the vane disposed in the nozzle flow path.

As illustrated in FIGS. 4 and 6, the exhaust gas flowing in from the scroll flow path 34 on the radially outer side (refer to FIGS. 2 and 3) collides with the pressure surface 53p of the vane 53 and flows along the pressure surface 53p from the leading edge 53f toward the trailing edge 53r.

On the concave curved surface 61 on the leading edge 53f side, the exhaust gas flow F is guided in the direction toward the middle portion of the pressure surface 53p in the width direction by the curvature of the concave curved surface 61.

The flow F of the exhaust gas passing through the concave curved surface 61 reaches the convex curved surface through the planar intermediate portion 53c. On the convex curved surface 62, the rise dimension of the width-direction intermediate portion 53d increases toward the trailing edge 53r, and thus the exhaust gas flow F is guided to be divided into the both end portions 53a in the width direction.

The exhaust gas sent out radially inwards from the trailing edge 53r of the vane 53 is supplied to the turbine wheel 12. In the turbine wheel 12, the exhaust gas introduced from the leading edge 23f on the radially outer side collides with a pressure surface 23p of the blade 23. As a result, the turbine wheel 12 rotates around the central axis C (refer to FIGS. 1 and 2). As a result of the rotation of the turbine wheel 12, a centrifugal force acts on the exhaust gas flowing from the leading edge 23f toward the trailing edge 23r, and thus the exhaust gas may be biased radially outwards as the exhaust gas approaches the trailing edge 23r. However, part of the exhaust gas is guided to the radially inner side of the turbine wheel 12 (surface 22f side of the disk 22) by the convex curved surface 62 of the vane 53, and thus the exhaust gas is unlikely to be biased radially outwards. As a result, the exhaust gas flow F is dispersed throughout the radial direction downstream of the trailing edge 23r of the blade 23.

In the turbocharger 10 according to the above-described embodiment, the vane 53 adjusting the amount of gas introduced in the nozzle flow path 35 is provided with the guide section 60 guiding the gas flow F in the turbine wheel 12 radially inwards. Because of this configuration, gas flowing through the scroll flow path 34 is guided to the turbine wheel 12 on the radially inner side through the nozzle flow path 35. Once the gas collides with the vane 53 disposed in the nozzle flow path 35, at least part of the gas flow F is guided to the radially inner side of the turbine wheel 12 by the guide section 60. As a result, the gas flow F is unlikely to be biased radially outwards. Accordingly, the gas flow F is dispersed throughout the radial direction downstream of the trailing edge 23r of the blade 23, no flow speed imbalance is likely to occur downstream of the trailing edge of the blade, and loss reduction can be achieved.

As a result, turbine efficiency enhancement can be achieved from a uniform gas flow speed distribution in the vicinity of the trailing edge 23r of the blade 23 of the turbine wheel 12.

Furthermore, the guide section 60 has the convex curved surface 62 formed to rise on the trailing edge 53r side on the flow F direction downstream side of the pressure surface 53p of the vane 53. As a result, gas flowing along the vane 53 is guided to be divided into both sides in the width direction by the convex curved surface 62. As a result, part of the flow F of the gas passing through the vane 53 can be reliably guided to the radially inner side of the turbine wheel 12.

Furthermore, the guide section 60 is provided with the concave curved surface 61 at the leading edge 53f on the flow F direction upstream side of the pressure surface 53p of the vane 53. As a result, gas colliding with the vane 53 is guided by the concave curved surface 61 to be brought toward the middle portion in the width direction. Accordingly, the gas flow F heading toward the trailing edge 53r side of the vane 53 from the concave curved surface 61 flows to be brought to the middle portion in the width direction and then spread and caused to branch to both sides in the width direction by the convex curved surface 62. Accordingly, the gas flow F can be more efficiently controlled by the convex curved surface 62.

Figure 7:
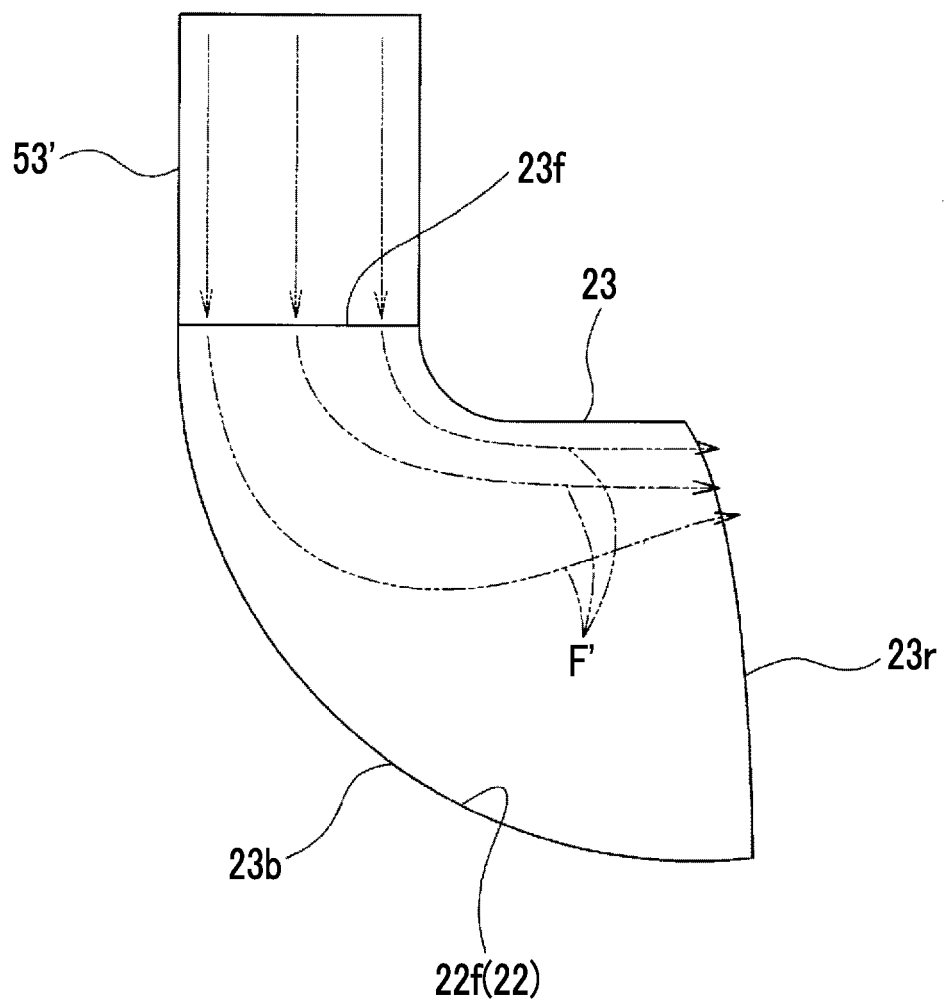
FIG. 7 is a schematic diagram for comparison illustrating how exhaust gas flows that flows into the turbine wheel through a vane provided with no guide section.

Here, the turbocharger 10 is a variable capacity-type turbocharger in which a gas introduction amount can be adjusted by the vane 53 changing the cross-sectional area of the nozzle flow path 35. In the small flow rate region of the variable capacity-type turbocharger 10 that has a small gas introduction amount with the gap between the vanes 53 next to each other narrowed, the narrow nozzle flow path 35 causes the flow speed of exhaust gas to rise and the exhaust gas to flow into the blade 23 with a strong orbiting component. Then, a flow F' of the exhaust gas is likely to be biased radially outwards by the centrifugal force of the turbine wheel 12 as illustrated in FIG. 7 in a case where, for example, a vane 53' is not provided with the guide section 60.

In contrast, radially outward biasing of the exhaust gas flow F can be suppressed, as described above, by the concave curved surface 61 and the convex curved surface 62 formed as the guide section 60 in the vane 53. Then, no flow speed imbalance is likely to occur downstream of the trailing edge 23r of the blade 23, and loss reduction can be achieved.

Accordingly, the efficiency of the turbocharger 10 can be enhanced in the small flow rate region and the performance of an engine into which gas compressed with the turbocharger 10 is sent can be enhanced ultimately.

Furthermore, part of the gas flow F is guided to the radially outer side of the turbine wheel 12 by the convex curved surface 62 of the vane 53. On the radially outer side of the turbine wheel 12, gas leakage occurs at the gap between the nozzle plate 52 and the tip of the blade 23. In this regard, a gas-based seal effect can be obtained by part of the gas flow being guided to the radially outer side of the turbine wheel 12. Turbine efficiency enhancement can be achieved from this as well.

OTHER EMBODIMENTS

The present invention is not limited to the above-described embodiment, and any change in design is possible within the scope of the present invention.

For example, the cross-sectional shape of the concave curved surface 61 and the convex curved surface 62 is not limited to the shape according to the above-described embodiment. The concave portion and the convex portion may be formed in any shape insofar as the gas flow can be controlled.

The configuration of each part of the turbocharger 10 such as the turbocharger body 11, the compressor 17, and the turbine 30 is not limited to the above-described example and can be modified to another configuration.

INDUSTRIAL APPLICABILITY

The present invention can be applied to a turbocharger. According to the present invention, turbine efficiency enhancement can be achieved from a uniform gas flow speed distribution in the vicinity of a blade trailing edge of a turbine wheel by a guide section that guides a gas flow radially inwards with the turbine wheel being formed in a gas introduction amount-adjusting vane.

REFERENCE SIGNS LIST

10 Turbocharger
11 Turbocharger body
12 Turbine wheel
13 Compressor wheel
14 Rotating shaft
14a First end portion
14b Second end portion
15A, 15B Bearing
16 Bearing housing
16a, 16b Opening
17 Compressor
18 Compressor housing
22 Disk
22f Disk surface
23 Blade
23f Leading edge
23p Pressure surface
23r Trailing edge
23s Outer edge
25 Impeller flow path
30 Turbine
31 Turbine housing
32 Gas introduction section
34 Scroll flow path
35 Nozzle flow path
36 Exhaust section
41 Back plate
50 Variable vane mechanism
51 Nozzle mount
52 Nozzle plate
53 Vane
53a Both end portions
53b Width-direction intermediate portion 53c Intermediate portion
53d Width-direction intermediate portion
53f Leading edge
53p Pressure surface
53r Trailing edge
53s Suction surface
54 Shaft
55 Drive unit
56 Drive ring
57 Link arm
60 Guide section
61 Concave curved surface (concave portion)
62 Convex curved surface (convex portion)
C Central axis (axis)
F Gas flow

The invention claimed is:

1. A turbocharger comprising:
a rotating shaft extending along an axis;
a turbine wheel disposed on a first end portion side of the rotating shaft, a plurality of blades being formed at intervals in a circumferential direction on the turbine wheel;
a turbine housing accommodating the turbine wheel;
a scroll flow path formed in the turbine housing, continuing in the circumferential direction on a radially outer side of the turbine wheel, and having gas flowing therethrough that rotates and drives the turbine wheel;
a nozzle flow path that guides the gas radially inwards from the scroll flow path and supplies the gas to the turbine wheel; and
a vane that adjusts the amount of the gas introduced in the nozzle flow path,
wherein the vane includes two end portions and a guide section that guides the gas such that at least part of the flow of the gas flows radially inwards on a trailing edge side of the blade of the turbine wheel,
the guide section is formed in a pressure surface on a side of the vane where the flow of the gas collides,
the guide section has a convex portion rising in a trailing edge portion on a downstream side in a flow direction of the gas,
the convex portion is formed such that a width-direction intermediate portion rises, in a direction away from a surface side opposite to the pressure surface, with respect to both end portions in a width direction on a trailing edge side of the pressure surface, and
the convex curved surface is formed such that a rise dimension of the width-direction intermediate portion gradually increases from an intermediate portion side toward the trailing edge side of the pressure surface.

2. The turbocharger according to claim 1, wherein the guide section has a concave portion formed in a leading edge portion of the pressure surface on an upstream side in the flow direction and concave to the surface side opposite to the pressure surface.

* * * * *